(12) United States Patent
Petratschek et al.

(10) Patent No.: US 11,400,653 B2
(45) Date of Patent: Aug. 2, 2022

(54) METHOD FOR OPERATING AN APPARATUS FOR ADDITIVELY MANUFACTURING THREE-DIMENSIONAL OBJECTS

(71) Applicant: CONCEPT LASER GMBH, Lichtenfels (DE)

(72) Inventors: André Petratschek, Burgkunstadt (DE); Benjamin Günther, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 741 days.

(21) Appl. No.: 16/290,945

(22) Filed: Mar. 3, 2019

(65) Prior Publication Data
US 2020/0047416 A1 Feb. 13, 2020

(30) Foreign Application Priority Data
Aug. 10, 2018 (EP) .................................... 18188567

(51) Int. Cl.
| | |
|---|---|
| *B29C 64/393* | (2017.01) |
| *B22F 10/20* | (2021.01) |
| *B29C 64/153* | (2017.01) |
| *B29C 64/277* | (2017.01) |
| *B29C 64/268* | (2017.01) |
| *B33Y 50/00* | (2015.01) |
| *B33Y 10/00* | (2015.01) |
| *B33Y 30/00* | (2015.01) |
| *B33Y 50/02* | (2015.01) |
| *B29C 64/371* | (2017.01) |
| *B22F 10/30* | (2021.01) |

(52) U.S. Cl.
CPC ............ *B29C 64/393* (2017.08); *B22F 10/20* (2021.01); *B29C 64/153* (2017.08); *B29C 64/268* (2017.08); *B29C 64/277* (2017.08); *B22F 10/30* (2021.01); *B22F 2201/11* (2013.01); *B29C 64/371* (2017.08); *B33Y 10/00* (2014.12); *B33Y 30/00* (2014.12); *B33Y 50/02* (2014.12)

(58) Field of Classification Search
CPC ... B29C 64/393; B29C 64/153; B29C 64/268; B29C 64/277; B29C 64/371; B29C 64/386; B29C 64/135; B22F 10/20; B22F 10/30; B22F 2201/11; B33Y 10/00; B33Y 30/00; B33Y 50/02; B33Y 50/00; Y02P 10/25
USPC ........................................................ 700/117
See application file for complete search history.

(56) References Cited

U.S. PATENT DOCUMENTS

| | | | |
|---|---|---|---|
| 2012/0299170 A1 | 11/2012 | Kumar | |
| 2018/0345409 A1* | 12/2018 | Pavlov | ................... B33Y 50/02 |
| 2019/0287759 A1* | 9/2019 | Own | ..................... H01J 37/244 |

OTHER PUBLICATIONS

European Search Report Corresponding to EP18188567 dated Apr. 1, 2019.

(Continued)

*Primary Examiner* — Michael J Brown
(74) *Attorney, Agent, or Firm* — Dority & Manning, P.A.

(57) ABSTRACT

Method for operating an apparatus (1) for additively manufacturing three-dimensional objects (2) by means of successive layerwise selective irradiation and consolidation of layers of a build material (3) which can be consolidated by means of an energy beam (4), wherein at least one energy beam (4) is guided along at least one track segment (13, 16-18) in the build plane based on irradiation data generated based on a space-filling curve.

20 Claims, 2 Drawing Sheets

(56) References Cited

OTHER PUBLICATIONS

Figure 1:
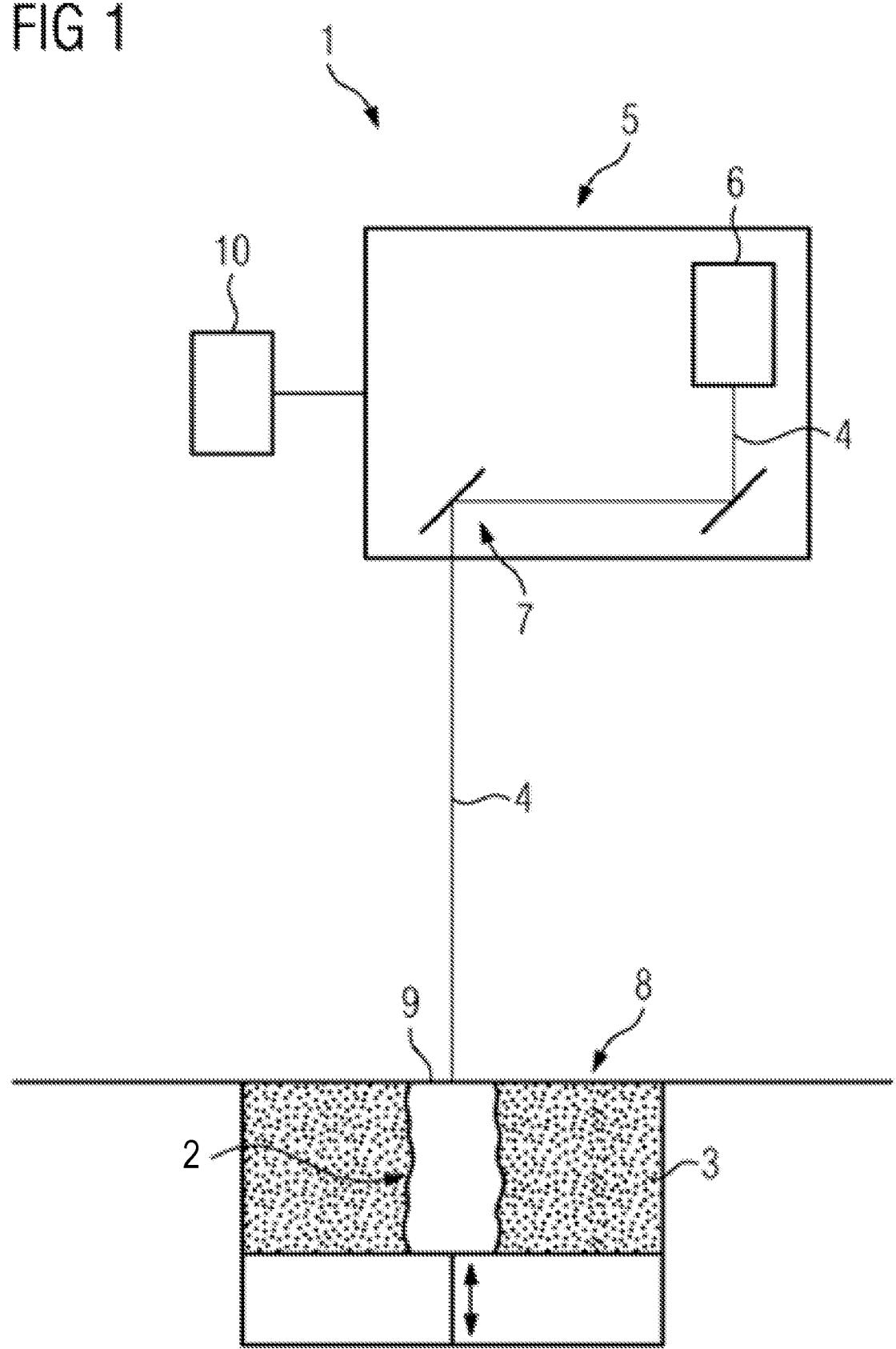

Catchpole-Smith et al., Fractal Scan Strategies for Selective Laser Melting of 'Unweldable' Nickel Superalloys, Additive Manufacturing, vol. 15, May 1, 2017, pp. 113-122.
Yang et al., Fractal Scanning Path Generation and Control System for Selective Laser Sintering (SLS), International Journal of Machine Tools and Manufacture, vol. 43, No. 3, Feb. 1, 2003, pp. 293-300.

* cited by examiner

METHOD FOR OPERATING AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 188 567.4 filed Aug. 10, 2018, the contents of which is incorporated herein by reference in its entirety as if set forth verbatim.

The invention relates to a method for operating an apparatus for additively manufacturing three-dimensional objects by means of successive layerwise selective irradiation and consolidation of layers of a build material which can be consolidated by means of an energy beam.

Apparatuses for additively manufacturing three-dimensional objects and methods for operating the same are generally known from prior art. For example, it is possible to guide an energy beam, such as a laser beam or an electron beam across a build plane in which build material is arranged to be selectively irradiated. By successive layerwise selective irradiation and consolidation the three-dimensional object may be built.

Further, it is known from prior art that while operating the apparatus, in particular irradiating build material, the track segment along which the energy beam is guided across the build plane has significant effect on the object quality. Hence, the build material can be irradiated dependent on a so-called "irradiation strategy" that defines how a layer is to be irradiated, in particular the sequence in which the individual regions in a layer are irradiated, for example the track along which the energy beam is guided across the build plane. For example, the sequence in which different regions of the layer of build material are irradiated can have an effect on mechanical properties due to residual stress introduced by irradiating different regions at different times, as the different cooling behavior of the different regions may lead to thermal strains and mechanical stress in the object.

It is an object of the present invention to provide a method for operating an apparatus for additively manufacturing three-dimensional objects, wherein stress in the object can be reduced.

The object is inventively achieved by a method according to claim 1.

Advantageous embodiments of the invention are subject to the dependent claims.

The method described herein is a method for operating an apparatus for additively manufacturing three-dimensional objects, e.g. technical components, by means of successive selective layerwise consolidation of layers of a powdered build material ("build material") which can be consolidated by means of an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for operating apparatuses for additively manufacturing three-dimensional objects, which apparatuses comprise at least one irradiation device that is adapted to generate an energy beam. The energy beam can be guided across the build plane to selectively irradiate the build material arranged in the build plane. The invention is based on the idea that at least one energy beam is guided along at least one track segment in the build plane based on irradiation data that are generated based on a space-filling curve.

Thus, it is possible to (continuously) guide the energy beam along the at least one track segment across the build plane, which track segment is defined by a space-filling curve. Therefore, (different) thermal strains due to borders of regions in the build material that are irradiated at different times can be reduced, as the space-filling curve allows for continuously guiding the energy beam across the area that is to be irradiated. Another advantage of guiding the energy beam along the track segment defined by a space-filling curve is that the energy beam can continuously be guided along the track segment and there is no need for repositioning the energy beam to different starting points and end points, for example compared to a stripe wise irradiation or an island irradiation, respectively, the effort for repositioning the energy beam can be reduced significantly.

The term "space-filling curve" in the scope of this application is understood as a curve in a two-dimensional plane (for example the build plane) covering essentially the entire area in which the space-filling curve is defined. The space-filling curve extends over a defined plane, such as the build plane, wherein every point of the plane can be covered with the curve. For example, an energy beam that is guided along a space-filling curve will scan over the entire area the space-filling curve fills. The space-filling curve can also be referred to as FASS-curve, wherein FASS is an acronym for "space-filling, self-avoiding, simple and self-similar". In the scope of this application it is only required that the space-filling curve fills the area it is assigned to, but it is not necessary that the space-filling curve is self-avoiding, for instance, although it may be preferred.

According to a preferred embodiment of the inventive method, a track area may be defined for at least one region of at least one layer that is to be irradiated. The track area may be filled with at least one track segment based on a space-filling curve. Subsequently, the intersection between the at least one region and the track area may be generated. Hence, for at least one region of a layer of an object, e.g. representing the cross section of the three-dimensional object that is additively manufactured, a track area may be defined, i.e. an area in which at least one track segment can be generated. The track area is, for example, larger than the at least one region of the layer and is defined in that the track area comprises the region of the layer. The track area that has been defined can afterwards be filled with at least one track segment, respectively, based on a space-filling curve. In other words, a space-filling curve can be generated in the track area covering the whole track area and thereby defining the track segment along which the energy beam will be guided for irradiating the build material arranged in the track area.

Subsequently, the intersection between the at least one region of the track area can be generated in that the position of the track segment(s) the track area is filled with is defined for the at least one region. In other words, as the track area comprises the at least one region of the layer, the track area defines the track segment(s) based on the space-filling curve, wherein the position of the track segment in the region of the layer is defined by the intersection between the at least one region of the track area. In particular, the track area may be filled with one track segment, wherein due to the intersection of the track area and the at least one region the track segment can be sub-divided into multiple track segments.

The inventive method may further be improved in that a start point and an end point may be defined for each track segment based on the points of intersection between the track area and the region to be irradiated. Hence, by generating the intersection between the at least one region of the layer and the track area, it is possible that, as the region may be fully comprised in the track area, the intersection "cuts" the at least one track segment that was defined based on the space-filling curve or that fills the track area, respectively. For example, the track area may be filled with a track segment that continuously scans over the entire area of the track area. As the region is comprised in the track area and may only form a minor part of the track area, the track segment extending through the track area will be cut at the border of the region by forming the intersection between the region and the track area.

For those cut track segments it is possible according to the present embodiment, to define a start point and an end point. Hence, due to the generation of the intersection between the track area and the region, the track segment that was defined based on the space-filling curve is sub-divided into multiple track segments, wherein a start point and an end point can be defined for each of those track segments.

The inventive method may further be improved in that each end point may be connected with a start point of the following track segment with respect to the direction defined by the space-filling curve. For example, as described before, the intersection between the track area and the at least one region may generate multiple track segments for which a start point and an end point can be assigned. The energy beam may be guided along those track segments from the start point to the end point, wherein each end point can be connected with a start point of the following track segment. The term "following" is understood in the scope of this application as defined by the space-filling curve, for example the sequence in which the individual track segments were comprised in the track segment as defined by the space-filling curve.

In general, any arbitrary space-filling curve can be used to define the at least one track segment along which the energy beam will be guided in the additive manufacturing process. In particular, it is possible to use a Hilbert-curve and/or a Peano-curve and/or an H-tree and/or a Z-curve and/or an E-curve and/or a Sierpinski-curve as space-filling curve. It is also possible to choose the type of space-filling curve dependent on at least one a geometrical parameter of the at least one region of the layer or the track area, respectively.

According to another embodiment of the inventive method, the irradiation data may be generated based on the space-filling curve for at least one region to be irradiated dependent on at least one structure parameter of the region, in particular the size and/or the shape of the region. Hence, it can be taken into calculation how large the region is and also the shape of the region can be taken into calculation. For example, the space-filling curve may be defined dependent on the shape of the region, as different shapes of the region require the definition of different track areas. It is particularly possible that different track areas may be filled with different space-filling curves more efficiently, for instance. As described before, the size of the track area is usually larger than the size of the region that is assigned to the track area in that the region is comprised in the track area. Hence, dependent on the size of the at least one region, a corresponding track area can be defined, wherein dependent on the size of the track area, a suitable space-filling curve can be chosen.

Further, it is possible to generate irradiation data based on the space-filling curve for at least one region comprising a core region and/or at least one region that is free of filigree structures. The term "core region" in the scope of this application may be understood as part of the region that is comparatively massive and does not involve thin structures, such as a wall structure, but may preferably be arranged in or around the center of the object involving a defined degree of coherent area of the respective region of the layer. The irradiation data may also be generated for at least one region that is free of filigree structures. For example, generating irradiation data based on space-filling curves is particularly efficient for coherent areas that do not involve fine structures such as geometrical details, as the region or the track area generated for the corresponding region, may be continuously filled with a track segment that is based on the space-filling curve, instead of generating a plurality of small regions for each filigree structure or each region that is interrupted by a filigree structure.

According to another embodiment of the inventive method, at least one track segment may be generated based on the space-filling curve with a defined track width of the at least one track segment dependent on a parameter of the energy beam, in particular a spot size of the energy beam. Thus, at least one parameter of the energy beam can be taken into calculation for generating the at least one track segment which is generated based on the space-filling curve. Hence, the track area and the at least one region of the layer may be filled with at least one track segment based on the space-filling curve dependent on characteristics of the energy beam, such as the spot size of the energy beam. Of course, the parameters of the energy beam, such as the shape of the spot, the intensity distribution and the like can also be taken into calculation. By providing information about the energy beam via the parameter of the energy beam, it is possible to define the space-filling curve in that it can be assured that the track area and the region of the layer can be fully scanned via the energy beam by guiding the energy beam along the at least one track segment.

The inventive method may further be improved in that the at least one energy beam can be guided along the at least one track segment based on the space-filling curve so as to generate a defined, in particular uniform, temperature distribution in the build material layer. Hence, stress is reduced by guiding the at least one energy beam along the at least one track segment based on the space-filling curve. Thus, the energy beam may continuously be guided along the track segment to avoid comparatively large temperature gradients in the build material layer that may lead to stress in the additively manufactured object. The continuous guiding of the energy beam along the track segment allows for uniformly depositing energy in the build material and therefore, avoiding thermal strains in the material leading to mechanical stress in the additively built object.

Besides, the invention relates to a method for generating irradiation data for an apparatus for additively manufacturing three-dimensional objects by means of successive layerwise selective irradiation and consolidation of layers of a build material which can be consolidated by means of an energy beam, which irradiation data comprise at least one track segment along which the energy beam can be guided across a build plane, wherein at least one track segment of the irradiation data is generated based on a space-filling curve. Of course, all details, features and advantages described with respect to the inventive method for operating the apparatus are fully transferable to the inventive method for generating irradiation data.

Further, the invention relates to a control unit for generating or receiving irradiation data, in particular for an apparatus for additively manufacturing three-dimensional objects by means of successive layerwise selective irradiation and consolidation of layers of a build material which can be consolidated by means of an energy beam, which irradiation data comprise at least one track segment along which the energy beam is guided across a build plane, wherein the control unit is adapted to generate at least one track segment of the irradiation data based on a space-filling curve. Of course, the control unit may also be adapted to control the apparatus, in particular guide the energy beam. Hence, the inventive control unit may also be adapted to perform the inventive method for operating the apparatus and/or the inventive method for generating irradiation data, as described before.

Besides, the invention relates to an apparatus for additively manufacturing three-dimensional objects by means of successive layerwise selective irradiation and consolidation of layers of a build material which can be consolidated by means of an energy beam, which apparatus comprises a control unit adapted to generate or receive irradiation data, in particular an inventive control unit, as described before, which irradiation data comprise at least one track segment along which the energy beam is guided across a build plane, wherein the control unit is adapted to generate at least one track segment of the irradiation data based on a space-filling curve. As described before, the inventive control unit may be adapted to operate the apparatus according to the inventive method for operating the apparatus and/or or the inventive control unit may be adapted to receive and/or to generate the irradiation data, in particular according to the inventive method for generating irradiation data.

Self-evidently, all features, details and advantages described with respect to the inventive method for operating the apparatus, the inventive method for generating irradiation data, the inventive control unit and the inventive apparatus are fully transferable and can arbitrarily be combined. Of course, the inventive method for operating the apparatus may be performed on the inventive apparatus. It is also possible to perform the inventive method for generating irradiation data on the inventive apparatus, preferably comprising an inventive control unit.

Figure 2:
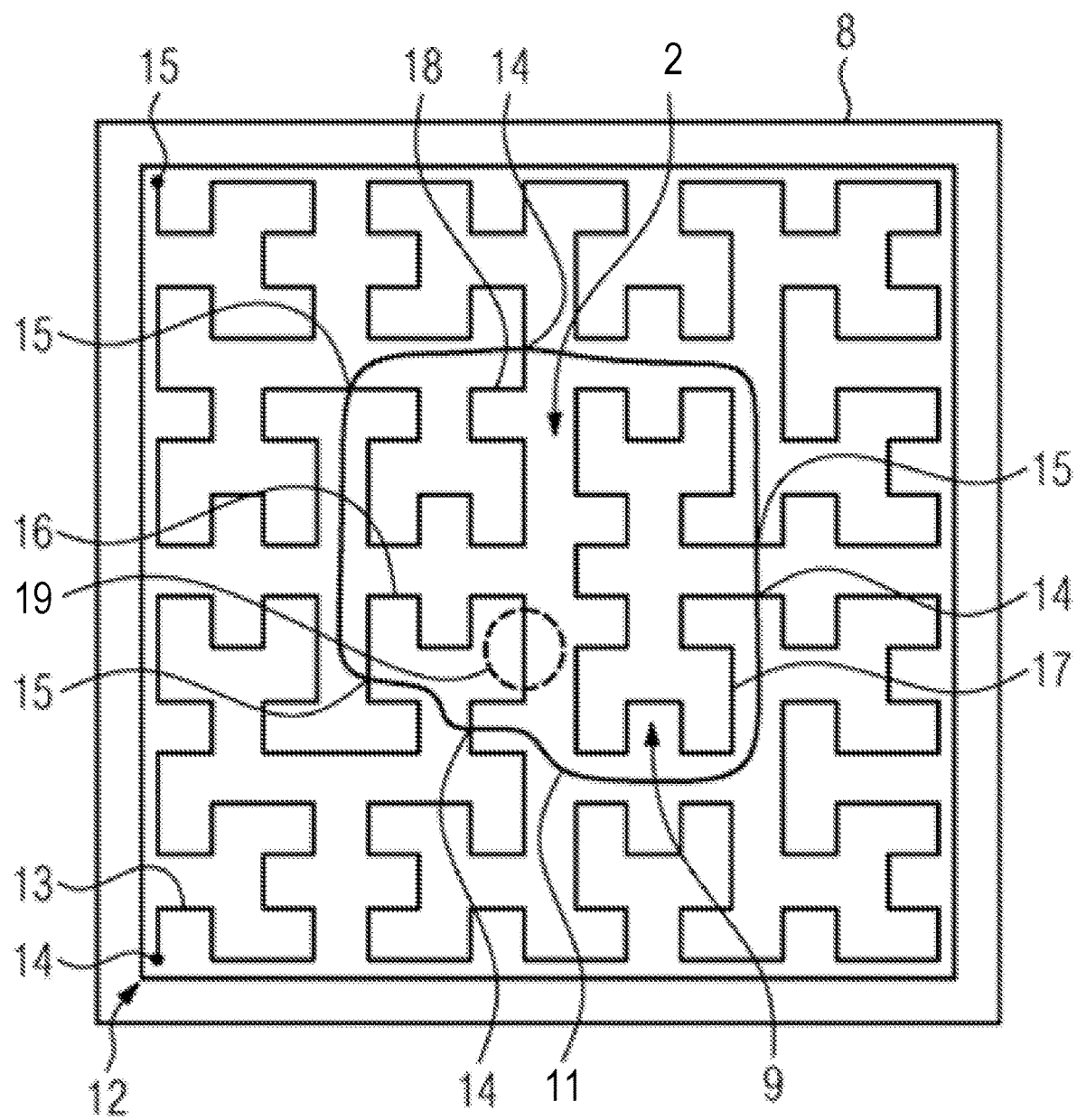

Exemplary embodiments of the invention are described with reference to the Fig. The Fig. are schematic diagrams, wherein FIG. 1 shows an inventive apparatus; and
FIG. 2 shows a top view on the build plane of the inventive apparatus from FIG. 1.

FIG. 1 shows an apparatus 1 for additively manufacturing three-dimensional objects 2 by means of successive layerwise selective irradiation and consolidation of layers of a build material 3 which can be consolidated by means of an energy beam 4, for example a laser beam. The apparatus 1 comprises an irradiation device 5 with a beam source 6, such as a laser source and a beam guiding unit 7, for example comprising a movable mirror element. The irradiation device 5 of the apparatus 1 is adapted to guide the energy beam 4 across a build plane 8 in which the build material 3 can layerwise be applied and successively irradiated. In each layer of build material 3 that corresponds to a layer of the object 2, the energy beam 4 irradiates at least one region 9 corresponding to the cross-section of the object 2 in that layer.

In this exemplary embodiment, the apparatus 1 comprises a control unit 10 that is adapted to control the irradiation device 5 and further adapted to generate irradiation data based on which the energy beam 4 can be guided across the build plane 8. The irradiation data are generated based on a space-filling curve, as will be described with respect to FIG. 2 below.

FIG. 2 shows a schematic view on the build plane 8 of the apparatus 1 from FIG. 1. In FIG. 2 the contour of the object 2, in particular the uppermost layer of the object 2, i.e. defining the region 9 that is to be irradiated, is depicted. Hence, in the actual layer the region 9 is to be irradiated via the energy beam 4, as described before. Hence, for generating the irradiation data, a track area 12 is defined, in this exemplary embodiment a square. Of course, it is also possible to define the track area in the whole build plane 8.

In the track area 12 a track segment 13 is generated between a starting point 14 and an end point 15, wherein the definition of the start point 14 and the end point 15 is arbitrary. The track segment 13 is based on a space-filling curve, for example a Hilbert curve. The space-filling curve thereby, fills the whole track area 12, wherein the energy beam 4 guided along the segmented track 13 would scan over the entire track area 12. In this exemplary embodiment, the space-filling curve is self-avoiding, i.e. does not intersect with itself.

Subsequently, the intersection can be generated between the region 9, as depicted via a contour 11 and the track area 12 in that three track segments 16, 17, 18 are generated in the region 9. At the intersection between the segmented track 13 in the track area 12 and the contour 11 of the object 2, in particular the region 9, a start point 14 and an end point 15 can be defined for each track segment 16, 17 and 18. Subsequently, the track segments 16, 17, 18 may be irradiated via the energy beam 4 in the sequence the track segments 16, 17 and 18 are defined in the track segment 13. In other words, the irradiation can start at the start point 14 of the track segments 16 and end at the end point 15 of the track segments 16. The end point 15 of the track segments 16 may be connected with the start point 14 of the track segments 17 in that the energy beam 4 can "jump" from the end point 15 of the track segments 16 to the start point 14 of the track segments 17.

Accordingly after the energy beam 4 is guided along the track segment 17 to the end point 15 of the track segment 17, the energy beam 4 can "jump" to the start point 14 of the track segment 18 and can be guided along the track segment 18 to the end point 15 of the track segment 18. Thus, the whole region 9 can be scanned via the energy beam 4 without introducing or with reduced mechanical stress in the layer of the object 2. In this exemplary embodiment, the track segment 13 is defined with respect to at least one parameter of the energy beam 4, for example a spot size of a spot 19 of the energy beam 4, as depicted via a dotted circle. In other words, the spot 19 of the energy beam 4 is guided along the track segments 16, 17 and 18, as described before, to irradiate the region 9 in the build plane 8.

The generation of irradiation data can of course be performed in advance to an additive manufacturing process or during an additive manufacturing process, for example in advance to the irradiation of each region 9 for every layer of the object 2. As can further be derived from FIG. 2, the region 11 is a comparatively massive structure without any filigree parts and can be understood as "core region", as no thin wall structures are comprised in the region 11. Of course, any arbitrary other space-filling curve can be used as basis for the generation of the segmented track 13, such as Peano-curves, E-curves, Z-curves, H-trees and the like.

Self-evidently, the inventive method for operating the apparatus may be performed on the apparatus 1, as described before. Further, the inventive method for generating the irradiation data may be performed on the control unit 10 that is comprised in the apparatus 1 (optional) in this exemplary embodiment. It is also possible that the control unit 10 receives the irradiation data are generated in another control unit external to the apparatus 1.

The invention claimed is:

1. A non-transitory computer-readable medium comprising computer-executable instructions, which when executed by a processor associated with an additive manufacturing apparatus, cause the additive manufacturing apparatus to perform a method of additively manufacturing a three-dimensional object, the method comprising:
    determining a track area comprising at least a portion of a build plane of an additive manufacturing apparatus, and determining a track segment within the track area based at least in part on a space-filling curve;
    determining an irradiation region defining a portion of the build plane to be irradiated by an energy beam emitted by an irradiation device of the additive manufacturing apparatus to form a layer of the three-dimensional object, the irradiation region overlapping at least a portion of the track area, and the track segment comprising a plurality of intersections respectively defining a location where the track segment intersects the irradiation region;
    determining one or more track subsegments respectively comprising a portion of the track segment overlapping at least a portion of the irradiation region, the one or more track subsegments respectively comprising a start point corresponding to a first one of the plurality of intersections and an end point corresponding to a second one of the plurality of intersections; and
    generating irradiation data configured to cause the irradiation device to irradiate the irradiation region with the energy beam following the one or more track subsegments.

2. The non-transitory computer-readable medium of claim 1, wherein the track segment fills the track area.

3. The non-transitory computer-readable medium of claim 1, wherein determining the one or more track subsegments comprises:
    determining the plurality of intersections respectively defining the location where the track segment intersects the irradiation region.

4. The non-transitory computer-readable medium of claim 3, wherein determining the one or more track subsegments comprises:
    determining, for respective ones of the one or more track subsegments, the start point corresponding to the first one of the plurality of intersections and the end point corresponding to the second one of the plurality of intersections.

5. The non-transitory computer-readable medium of claim 1, wherein the one or more track subsegments comprises a plurality of track subsegments.

6. The non-transitory computer-readable medium of claim 5, wherein the irradiation data is configured to cause the irradiation device to irradiate the irradiation region with the energy beam following the plurality of track subsegments in sequence according to a sequential arrangement of the plurality of track subsegments along the track segment.

7. The non-transitory computer-readable medium of claim 5, wherein the plurality of track subsegments respectively comprise a distinct portion of the track segment overlapping a respectively distinct portion of the irradiation region.

8. The non-transitory computer-readable medium of claim 7, wherein the plurality of track subsegments comprise a first track subsegment overlapping a first portion of the irradiation region; and a second track subsegment overlapping a second portion of the irradiation region.

9. The non-transitory computer-readable medium of claim 8, wherein the first track subsegment comprises a first start point and a first end point, and wherein the second track subsegment a second start point and a second end point.

10. The non-transitory computer-readable medium of claim 9, wherein the first start point, the first end point, the second start point, and the second end point, are respectively arranged sequentially along the track segment.

11. The non-transitory computer-readable medium of claim 10, wherein the irradiation data is configured to cause the irradiation device to irradiate the irradiation region with the energy beam following the first track subsegment from the first start point to the first end point, and the second track subsegment from the second start point to the second end point, in sequence according to a sequential arrangement of the first track subsegment and the second track subsegment along the track segment.

12. The non-transitory computer-readable medium of claim 11, wherein when irradiating the irradiation region according to the irradiation data, the irradiation device causes the energy beam to jump from the first end point to the second start point.

13. The non-transitory computer-readable medium of claim 12,
    providing the irradiation data to the irradiation device and irradiating the irradiation region with the energy beam.

14. The non-transitory computer-readable medium of claim 8, wherein the plurality of track subsegments comprise a third track subsegment overlapping a third portion of the irradiation region.

15. The non-transitory computer-readable medium of claim 14, wherein the first track subsegment, the second track subsegment, and the third track subsegment are arranged sequentially along the track segment.

16. The non-transitory computer-readable medium of claim 1, wherein the space-filling curve comprises at least one of: a Hilbert-curve, a Peano-curve, an H-tree, a Z-curve, an E-curve, or a Sierpinski curve.

17. The non-transitory computer-readable medium of claim 1, comprising at least one of:
    determining the track segment and/or the space-filling curve based at least in part on one or more structure parameters of the irradiation region; or
    determining the track segment based at least in part on a track width, wherein the track width depends at least in part on an energy beam parameter.

18. The non-transitory computer-readable medium of claim 1, comprising:
   providing the irradiation data to the irradiation device and irradiating the build plane with the energy beam at least with respect to the irradiation region.

19. The non-transitory computer-readable medium of claim 18, wherein irradiating the build plane with the energy beam comprises:
   guiding the energy beam along the entire track segment while irradiating the build plane with the energy beam at least when the energy beam coincides with the one or more track subsegments.

20. The non-transitory computer-readable medium of claim 19, wherein irradiating the build plane with the energy beam generates a defined temperature distribution in a build material layer coinciding with the build plane.

\* \* \* \* \*